United States Patent
Magyar et al.

(12)

(10) Patent No.: US 6,207,131 B1
(45) Date of Patent: *Mar. 27, 2001

(54) METHOD AND APPARATUS FOR PRODUCING TITANIUM DIOXIDE

(75) Inventors: John C. Magyar, Ackerman, MS (US); Alan J. Morris, Oklahoma City, OK (US); Glenn D. Wootten, Columbus, MS (US); William A. Yuill, Edmond, OK (US)

(73) Assignee: Kerr-McGee Chemical LLC, Oklahoma City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/887,649

(22) Filed: Jul. 3, 1997

Related U.S. Application Data

(63) Continuation-in-part of application No. 08/687,280, filed on Jul. 25, 1996, now Pat. No. 5,840,112.

(51) Int. Cl.$^7$ .............................................. C01G 23/047
(52) U.S. Cl. ............................................................ 423/613
(58) Field of Search ................................. 423/613, 614; 106/437

(56) References Cited

U.S. PATENT DOCUMENTS

| | | | |
|---|---|---|---|
| 2,437,171 | 3/1948 | Pechukas | 106/300 |
| 3,120,427 | * 2/1964 | Mas et al. | 423/613 |
| 3,505,091 | * 4/1970 | Santos | 423/613 |

(List continued on next page.)

FOREIGN PATENT DOCUMENTS

| | | |
|---|---|---|
| 2948731 | 6/1981 | (DE). |
| 0583063 | 2/1994 | (EP). |
| 1064569 | 4/1967 | (GB). |
| 1145344 | 3/1969 | (GB). |
| 2037266 | 7/1980 | (GB). |
| 2269585 | 2/1994 | (GB). |

OTHER PUBLICATIONS

Article by Robert D. Shannon and Joseph A. Pask entitled "Kinetics of the Anatase–Rutile Transformation" dated Aug. 1965, published in the Journal of The American Ceramic Society at pp. 391–398.

Article by Yoko Suyama and Akio Kato entitled "Effect of Additives on the Formation of TiO2 Particles by Vapor Phase Reaction" dated Jun. 1985, published in the Journal of the American Ceramic Society at pp. C–154 to C–156.

*Primary Examiner*—Steven Bos
(74) *Attorney, Agent, or Firm*—C. Clark Dougherty, Jr.

(57) ABSTRACT

A process for reacting titanium tetrachloride vapors with oxygen to produce titanium dioxide wherein the oxygen is introduced into the reactor in at least two points. The process has the ability to control properties, such as particle size, of the raw pigment produced. The temperature of the oxygen introduced to the reactor at the further inlet point is above, below, or at the same temperature of the oxygen introduced at the first inlet point. The further inlet point can be located before or after the all the titanium tetrachloride has been introduced into the reactor. The titanium tetrachloride is introduced at a relatively low temperature, below about 427° C., and the reaction temperature in the reactor is at least about 700° C. The process includes the use of an auxilary fuel such as carbon monoxide, methane, propane, butane, pentane, hexane, benzene, xylene, toluene, or combinations thereof for increasing the temperature in the reactor. Still further, the process for producing titanium dioxide provides for the addition of aluminum chloride to the reactor. Advantageously, the process allows the pressure in the reactor to be above atmospheric pressure and range between about 0.15 MPa and 4.0 MPa above atmospheric pressure during the production of titanium dioxide. A reactor is also provided with an aluminum chloride generator for heating the titanium tetrachloride and delivering aluminum chloride to the reactor.

49 Claims, 5 Drawing Sheets

U.S. PATENT DOCUMENTS

| | | | |
|---|---|---|---|
| 3,512,219 | 5/1970 | Stern et al. | 23/277 |
| 3,914,396 * | 10/1975 | Bedetti et al. | 423/613 |
| 4,053,577 * | 10/1977 | Arkless | 423/613 |
| 4,803,056 | 2/1989 | Morris et al. | 422/156 |
| 5,204,083 * | 4/1993 | Magyar et al. | 423/613 |
| 5,599,519 | 2/1997 | Haddow | 423/613 |
| 5,840,112 * | 11/1998 | Morris et al. | 423/613 |

* cited by examiner

SCHEMATIC FOR OXYGEN FLOW FOR SECONDARY OXYGEN TEST

METHOD AND APPARATUS FOR PRODUCING TITANIUM DIOXIDE

This application is a continuation-in-part of application Ser. No. 08/687,280, filed Jul. 25, 1996, now U.S. Pat. No. 5,840,112.

BACKGROUND OF THE INVENTION

The present invention relates to a process for producing titanium dioxide by reacting titanium tetrachloride vapors with oxygen and to an improved reactor for use in such a system. The process and reactor of the present invention provides the ability to control properties, such as particle size, of the titanium dioxide product.

It is well-known that titanium tetrachloride reacts with oxygen in the vapor phase to form titanium dioxide and that this reaction is initiated by heating the reactants to a suitable temperature. However hot titanium tetrachloride is highly corrosive and therefore many useful materials of construction for heat exchangers used to heat titanium tetrachloride are rapidly corroded. In practice this generally imposes an upper limit of about 400° C. (752° F.) on the temperature to which titanium tetrachloride can be heated by conventional heat exchangers.

A suitable temperature for the reactants (oxygen and titanium tetrachloride) is about 950° C. (1742° F.) and, in order to achieve this temperature in known processes, the oxygen feed must be heated sufficiently to compensate for the above-mentioned relatively low titanium tetrachloride temperature. Frequently, oxygen is heated directly or heated by an electrical discharge to temperatures of about 1427–1871° C. (2600–3400° F.) as oxygen is introduced into the oxidation reactor in combination with an auxiliary fuel. The use of these methods introduce unwanted impurities such as, for example, carbonaceous residues from the fuel or metallic impurities from the electrodes used for the electrical discharge.

SUMMARY OF THE INVENTION

According to the invention a process for the production of titanium dioxide comprises reacting titanium tetrachloride with oxygen at a pressure above atmospheric pressure and at a reaction temperature of at least about 700° C. (1292° F.) in an oxidation reactor, the oxygen being introduced into the reactor at a first inlet point and at least one further inlet point. Optionally, the titanium tetrachloride may be introduced as a mixture with aluminum chloride and heated to a temperature of at least about 350° C. (662° F.), the aluminum chloride being formed by reaction of aluminum and chlorine and the heat generated by this reaction being used to heat the titanium tetrachloride. The aluminum chloride may also be added by dissolving the aluminum chloride in the titanium tetrachloride.

According to the present invention, a reactor for producing titanium dioxide by reacting titanium tetrachloride vapors with oxygen comprises a means for forming a first reaction zone and an oxidizing gas introduction assembly for receiving oxygen at a predetermined temperature level and passing oxygen into the first reaction zone. The oxidizing gas introduction assembly comprises a conduit having an upstream and a downstream end and an opening extending therethrough intersecting the upstream and the downstream ends where oxygen is passable through the opening in the conduit for passing into the first reaction zone. The reactor further comprises a first titanium tetrachloride introduction assembly for receiving titanium tetrachloride vapors at a first predetermined temperature and passing titanium tetrachloride vapors into the first reaciton zone for reacting with oxygen to produce a mixture including titanium dioxide. Still further, the reactor comprises a means for passing the titanium tetrachloride vapor at the predetermined temperature into the first reaction zone and an including means for forming a second reaction zone spaced a distance downstream from the first reaction zone. The reactor also comprises a second oxidizing gas introduction assembly for receiving oxygen at a second predetermined temperature and passing the oxygen at the second temperature into the second reaction zone for reaction with titanium tetrachloride in the mixture from the first reaction zone to produce a mixture including titanium dioxide, the reaction of oxygen at the second temperature with the mixture passed from the first reaction zone reducing the volume of oxygen at the first temperature level required for a given volume of titanium dioxide produced and a means for passing the oxygen at the second temperature into the second reaction zone. Still further, the reactor comprises an aluminum chloride generator for heating the titanium tetrachloride vapors to a first predetermined temperature and a flowline for passing titanium tetrachloride from the aluminum chloride generator to the titanium tetrachloride introduction assembly.

DESCRIPTION OF THE PREFERRED EMBODIMENTS

Figure 1:
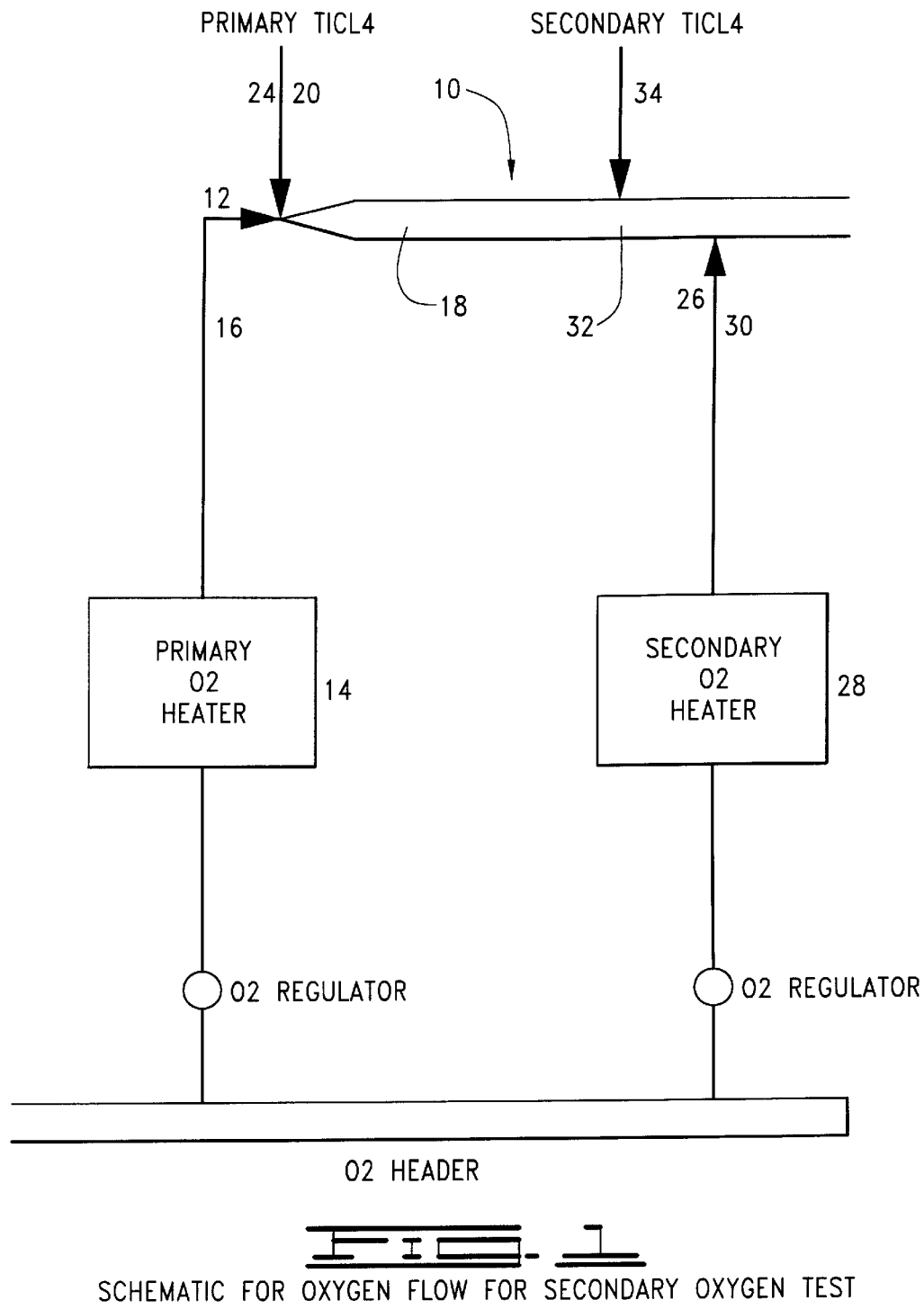
FIG. 1 is a diagrammatic view of the equipment for preheating oxygen for introduction into the reaction zones in the reactor.

Titanium dioxide (TiO$_2$), which is useful as a pigment, is produced on a commercial scale by reacting titanium tetrachloride vapor (TiCl$_4$) with oxygen (O$_2$). In one commercial process, a preheated oxidizing gas is passed into a reaction zone and preheated titanium tetrachloride vapor is passed into the same reaction zone where the titanium tetrachloride vapor is reacted with the oxygen contained in the oxidizing gas according to the following reaction:

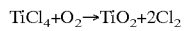

$$TiCl_4 + O_2 \rightarrow TiO_2 + 2Cl_2$$

In such a prior art process the combined temperature of the reactants (titanium tetrachloride and oxygen), before reaction, had to be at least about 871° C. (1600° F.) in order to sustain the oxidation reaction and, preferably, the combined temperature of the reactants was between about 899° C. (1650° F.) and about 982° C. (1800° F.). In one process, the oxidizing gas was preheated for introduction into the reaction zone to a temperature of about 982° C. (1800° F.) and titanium tetrachloride vapor was preheated for introduction into the reaction zone to a temperature of about 954° C. (1750° F.).

Titanium tetrachloride vapors at relatively high temperatures of about 954° C. (1750° F.) are highly corrosive. Operation at such a high temperature requires frequent maintainence and repair of the titanium tetrachloride preheating equipment. It is therefore desirable to develop a system for producing titanium dioxide by reacting titanium tetrachloride vapor with oxygen utilizing titanium tetrachloride vapors preheated to minimum temperature levels, such as below about 204° C. (400° F.) since this would minimize the cost of repair and maintainence of the titanium tetrachloride preheating equipment.

A reactor of the type utilized in the process for producing titanium dioxide by reacting titanium tetrachloride vapor with oxygen as described above was disclosed in U.S. Pat. No. 3,512,219, issued to Stem, and the configuration with a dual slot oxidizer (DSO) in U.S. Pat. No. 4,803,056 issued to Morris, et al., both specifically incorporated herein by reference.

In this prior process, pure oxygen was heated in a metal alloy tube furnace. In one embodiment, oxygen could only be heated to a maximum temperature of about 982° C. (1800° F.) due primarily to the thermal efficiency and the materials of construction of the oxygen preheating apparatus. Thus, in this process, titanium tetrachloride vapors also had to be heated to a temperature of about 982° C. (1800° F.) in the titanium tetrachloride vapor preheating apparatus. In the alternative, additional oxygen preheating equipment might be added to the existing oxygen preheating equipment in an effort to elevate the oxygen temperature to a level above 982° C. (1800° F.), thereby permitting the utilization of titanium tetrachloride vapors which have been preheated to lower temperature levels, below 982° C. (1800° F.). However, the additional oxygen preheating equipment represents a substantial expense which might not be offset by any savings in the titanium tetrachloride vapor preheating apparatus resulting from the lower temperature requirements for the titanium tetrachloride vapors.

In the above process, the titanium tetrachloride vapor preheating equipment utilized silica pipe for the containment of the highly corrosive titanium tetrachloride vapors. The size of the silica pipe was limited to a maximum of about six inches because of manufacturing techniques suitable for producing a relatively flawless silica pipe. Also, the strength and integrity of welded silica pipe joints decrease with increasing diameters and breakage is more probable with higher diameter silica pipes. A primary problem with silica is the failure rate. The failure rate is proportional to the surface area of the silica pipe. As the area of the silica pipe increases, the failure rate increases. Further, the maximum permissible pressures within the silica pipe decreases with increasing diameters and above six inch diameter silica pipes might result in working pressures insufficient to efficiently drive the titanium tetrachloride vapors downstream from the titanium tetrachloride vapor preheating equipment.

Auxiliary fuel normally is added at the upstream end of the reactor near the oxidizing gas introduction assembly. Injection of auxiliary fuels, such as carbon monoxide and methane directly into the reactor to stabilize the flame in the reactor has been suggested as a means for lowering the temperature level requirements for the titanium tetrachloride vapors, thereby increasing the capacity of existing titanium tetrachloride vapor preheating equipment, i.e., the silica pipe preheaters. This approach can lead to a reduction in temperature for preheating the $TiCl_4$ from about 954° C. (1750° F.) to about 399° C. (750° F.) when using supported combustion from an auxiliary fuel. However, using supported combustion generates combustion products which dilute the chlorine recycle gas and result in larger capacity downstream equipment being required to process the increased gas load.

The present invention determined that properties, such as particle size and other related properties, of the raw pigment produced in oxidation can be controlled over a wide range by controlling the titanium tetrachloride to oxygen ratio in the zone of the reactor where particles initially start to form or are nucleated. According to the present invention, the properties of raw pigment can be controlled by changing the ratio of $TiCl_4$ to $O_2$ in the region of the reactor where the $TiO_2$ particles start to form or are nucleated. Controlling the ratio of $TiCl_4$ to $O_2$ by this method requires a second $O_2$ addition downstream in the reactor to meet stoichiometric requirements for the over all reaction. Similar control of particle properties can be achieved by varying the mixing rate or injection angles, but these controls cannot be as conveniently adjusted as the flow rates of the $TiCl_4$ and $O_2$ reactants.

Tests performed using a hot secondary oxygen flow that was split using orifice plates produced pigments with much more positive tint tones, but since the relative oxygen flows were controlled by orifice plates it was difficult to control each $O_2$ flow so as to control particle size. One test performed regulated the oxygen flows while the oxygen was still cold and then heated each stream to the desired temperature. This test allowed for independent control of the volume and temperature of each gas stream. The use of secondary oxygen can be used to increase tint tone, scatter, and reduce aggregation. Reducing aggregation results in decreasing consistency, oil adsorption, dispersant demand for the finished pigments. A pigment with a more positive tint tone can be produced by using secondary oxygen. Diverting some of the oxygen going to the front of the oxidizer to a position behind the first $TiCl_4$ slot have made finished pigments with acrylic tint tones as positive as about −3.2. It is expected that tint tones more positive than −3.2 are obtainable using a secondary oxygen slot.

Shown in FIG. 1 is a schematic for the primary and secondary $O_2$ flows constructed in accordance with the present invention for use in a process for producing titanium dioxide by vapor-phase oxidation of titanium tetrachloride. In general, the reactor 10 comprises: a first oxidizing gas introduction assembly 12 which is adapted to receive oxygen from oxygen preheat equipment 14 by way of a flowline 16 and pass the oxygen at a first predetermined temperature into the first reaction zone 18 formed in the reactor 10; a first titanium tetrachloride vapor introduction assembly 20 which is adapted to receive titanium tetrachloride vapor at a first predetermined temperature from titanium tetrachloride preheat equipment by way of a flowline 24 and to pass the titanium tetrachloride vapor at the first predetermined temperature into the first reaction zone 18; and a second oxidizing gas introduction assembly 26 which is adapted to receive oxygen at a second predetermined temperature, which can be above, below, or the same temperature as the first oxygen temperature, from second oxidizing gas preheat equipment 28 by way of a flowline 30 and to pass oxygen at the second predetermined temperature into the second reaction zone 32, the mixture from the first reaction zone being passed into the second reaction zone for reacting with oxygen at the second temperature which simultaneously is being passed into the second reaction zone.

A second addition of titanium tetrachloride may be introduced into the reactor through a second titanium tetrachloride introduction assembly 34. The second titanium tetrachloride introduction assembly 34 is spaced a distance from the first titanium tetrachloride introduction assembly 20. The second titanium tetrachloride introduction assembly 34 receives titanium tetrachloride vapors at an elevated temperature and passes the titanium tetrachloride vapors into the reactor near the second reaction zone 32. The second oxidizing gas introduction assembly 26 can be located between the first and second titanium tetrachloride introduction assemblies 20 and 34. Alternatively, the second oxidizing gas introduction assembly 26 can be located after the second titanium tetrachloride introduction assembly 34 such that the second titanium tetrachloride introduction assembly is between the first titanium tetrachloride introduction assembly and the second oxidizing gas introduction assembly.

The reactor is a continuous tube but can be divided into two zones for purposes of discussion. As used herein "first reaction zone" refers to the region of the reactor near the first oxygen inlet point where the reaction between $TiCl_4$ and $O_2$ is initiated and where the $TiO_2$ particles are nucleated. As used herein, "second reaction zone" refers to the region of the reactor extending downstream from the first reaction zone where interparticle reactions occur and the particles grow by the aerosol process to the desired size. The second titanium tetrachloride introduction assembly is positioned on the reactor such that it is located within the second reaction zone. It is believed that the reaction between titanium tetrachloride and oxygen occurs throughout the reactor and is not isolated in any one particular zone.

In a preferred embodiment, oxygen is fed to the reactor 10 from the $O_2$ header shown at the bottom of FIG. 1. Oxygen preheaters 14 and 28 receive oxygen from the header and are capable of preheating oxygen to about 954° C. (1750° F.). The preheaters 14 and 28 heat the oxygen to the respective predetermined temperatures. Oxygen preheater 14 heats from about 50% to about 95% of the total $O_2$ to be fed into the reactor and preheater 28 heats the balance of the total $O_2$, from about 5% to about 50%, to be fed into the reactor 10. The primary oxygen leaves preheater 14 through an insulated pipe 16 that coaxially joins the larger tube that serves as the reactor at the oxidation gas introduction assembly 12. An inlet for auxiliary fuel and scour media is located near the oxidation introduction assembly 12 and serves to introduce the fuel to the hot oxygen and to direct scour media for cleaning the reactor walls in the reactor. The inlet is located far enough upstream in the reactor to allow for nearly complete combustion of the auxiliary fuel and to provide the proper trajectory for the scour media entering the reactor. The secondary oxygen leaves preheater 28 through an insulated pipe 30 and enters the reactor at the second oxidizing gas introduction assembly 26.

The first increment of $TiCl_4$ which has been preheated to about 399° C. (750° F.), primary $TiCl_4$, is introduced into the reactor through the first titanium tetrachloride introduction assembly 20. The hot primary $O_2$ and $TiCl_4$ are swept into the first reaction zone 18 of the reactor. It will be appreciated that properties of the pigment including tint tone can be accurately controlled by varying the relative amounts of primary $TiCl_4$ and primary $O_2$ fed through oxidizing into the first reaction zone 18. The amount of $TiCl_4$ fed through the titanium tetrachloride introduction assembly 20 has, in practice, varied from about two thirds to all of the $TiCl_4$ fed to the reactor. The hot gases consisting of unreacted $O_2$ and $TiCl_4$ and very fine $TiO_2$ particles pass from the first section of the reactor 18 to the second section of the reactor 25. The remainder of the $TiCl_4$ is fed through the second titanium tetrachloride introduction assembly 34 into the second reaction zone 32 where the $TiO_2$ particles are grown to full size.

The amount of $TiCl_4$ that can be fed through the second titanium tetrachloride introduction assembly 34, secondary $TiCl_4$, is determined by the overall response of the reactor. If too much $TiCl_4$ is fed through the second titanium tetrachloride introduction assembly 34, unreacted $TiCl_4$ will leave the second reaction zone 32 and appear in the final product. If too little $TiCl_4$ is added through the second titanium tetrachloride introduction assembly 34, the consumption of auxiliary fuel increases. The optimum amount covers a fairly wide range of flows and is determined by other operating parameters for the reactor. The amount of secondary $O_2$ added at the second oxidizing gas introduction assembly 26 is determined by how much unreacted $TiCl_4$ is present in the mixture downstream of the second titanium tetrachloride introduction assembly 34. Typical operating practice is to add enough total $O_2$ so that the export gases contain from about 7 to 10 percent $O_2$.

Preferably, oxygen preheat equipment 14 is constructed to heat the primary oxygen to a temperature of about 954° C. (1750° F.), advantageously from about 815° C. (1500° F.) to about 982° C. (1800° F.). The second oxygen preheat equipment 28 advantageously heats the secondary oxygen from about 25° C. (77° F.) to temperatures as high as about 1038° C. (1900° F.). Such oxygen preheat equipment is commercially available and is well known in the art.

In a preferred embodiment, titanium tetrachloride preheat equipment heats titanium tetrachloride to a temperature of about 177° C. (350° F.) to produce titanium tetrachloride vapors. Such titanium tetrachloride preheat equipment is commercially available and is well known in the art. In one embodiment, for example, the titanium tetrachloride is heated and vaporized in a shell-and-tube type heat exchanger operating at a temperature of about 177° C. (350° F.). One type of heater is a shell-and-tube heat exchanger with a u-shaped tube bundle of nickel and glass-lined carbon steel sheet. The tube-side heating medium normally is steam, but may, at temperatures approaching 204° C. (400° F.), be some other heat transfer fluid such as Dow-therm, should suitable steam pressure be unavailable. One silica pipe heater which is useful for receiving titanium tetrachloride at about 204° C. (400° F.) is a tubular radiant-heat furnace with vertical silica pipe. The titanium tetrachloride vapors introduced into the reactor through the first titanium tetrachloride introduction assembly 20 are further heated to a temperature of less than about 427° C. (800° F.), preferably less than about 399° C. (750° F.), before injection into the reactor. The titanium tetrachloride vapors introduced through the second titanium tetrachloride introduction assembly 34 are preferably introduced at a temperature of about 177° C. (350° F.). Preferably, one titanium tetrachloride preheater is used to preheat the $TiCl_4$ to produce the $TiCl_4$ vapors. The preheated $TiCl_4$ vapors would then be split into two lines, one directed to the second titanium tetrachloride introduction assembly and the other to additional heating equipment for further heating before being passed to the first titanium tetrachloride introduction assembly.

In a preferred embodiment, assuming a capacity of 100 tons per twenty-four hour period of titanium dioxide produced utilizing reactor 10, the flow of primary oxygen gas into the oxidizing gas introduction assembly and through the reactor 10 is about 60 pound mole per hour, the flow level of primary titanium tetrachloride into the titanium tetrachloride introduction assembly 20 and through the reactor 10 is about 104 pound mole per hour and the flow of secondary oxygen at the second temperature into the second oxidizing gas introduction assembly and through reactor 10 is about 60 pound mole per hour. In this embodiment, about one pound mole per hour of oxygen together with two hundred pounds per hour of sand are passed through the injection tube. It will be appreciated that secondary oxygen could be used with the reactor of the present invention without the use of scour sand in the reaction zone In operation, oxygen is preheated in oxygen preheat equipment 14 to the predetermined temperature and then passed at a controlled, predetermined rate through flowline 16 to the oxidizing gas introduction assembly 12 and passes into the first reaction zone 18.

Titanium tetrachloride is preheated in titanium tetrachloride preheat equipment to a predetermined temperature and passed through flowline 24 at a controlled rate into titanium tetrachloride introduction assembly 20 and into the first reaction zone 18, where oxygen at the first temperature and titanium tetrachloride react to produce a mixture including particles of titanium dioxide, this mixture being passed downstream into the second reaction zone 32. Oxygen is preheated in second oxidizing gas preheat equipment 28 to predetermined second temperature and passed at a controlled rate through flowline 30 to the second oxidizing gas introduction assembly 26 and into the second reaction zone 32, where oxygen at the second temperature reacts with the titanium tetrachloride in the mixture passed from the first reaction zone 18 to produce a mixture including additional titanium dioxide, the mixture from the second reaction zone 32 being passed downstream for further processing in a manner known in the art of producing titanium dioxide by vapor phase oxidation of titanium tetrachloride.

In order to ensure rutile is the dominant phase in the titanium dioxide product, the temperature in the reaction zones must be above a minimum temperature level of about 1204° C. (2200° F.). Reagents, such as aluminum chloride and water vapor, may be added to the reactor for controlling or modifying titanium dioxide pigment properties. Because alumina and water act as rutilization agents, the minimum temperature level depends on the amount of alumina and water present in the system. As the water and alumina content increases, the rate of rutilization increases.

The combined temperature of the reactants, prior to reaction, to produce the required reactions, must be at least 871° C. (1600° F.) to sustain the oxidation reaction and preferably, the combined temperature of the reactants, before reaction, should be in the range of from about 899° C. (1650° F.) to about 982° C. (1800° F.). In one operational process for producing titanium dioxide by vapor-phase oxidation of titanium tetrachloride, oxygen is preheated to a temperature level of about 982° C. (1800° F.) and titanium tetrachloride is preheated to a temperature level of above about 954° C. (1750° F.). In this process, oxygen and titanium tetrachloride vapors are reacted in a reaction zone utilizing a reactor like that disclosed in Stern, et al., U.S. Pat. No. 3,512,219, to produce a mixture including some titanium dioxide, and the mixture consisting of unreacted $TiCl_4$ and $O_2$ and reaction products is passed downstream for further processing.

The reaction of titanium tetrachloride vapors with oxygen to form titanium dioxide is exothermic. In a completely adiabatic system, starting with 177° C. (350° F.) $TiCl_4$ vapor and 25° C. (77° F.) oxygen, a reaction temperature of about 1316° C. (2400° F.) is attainable, which is above the minimum temperature of 1204° C. (2200° F.) required to insure rutile as the dominant phase in the titanium dioxide product of reaction. The system of the present invention utilizes this heat of reaction to reduce the preheat requirement for a portion of the titanium tetrachloride vapors utilized.

Utilizing only the first reaction zone and assuming a flow of oxygen from oxygen preheat assembly of 60 pound moles per hour at a temperature level of about 982° C. (1800° F.) and assuming a flow of titanium tetrachloride from the titanium tetrachloride preheat assembly of 52 pound moles per hour at a temperature of about 982° C. (1800° F.), about 4150 pounds per hour of titanium dioxide are produced and the heat of reaction in the first reaction zone, assuming a completely adiabatic system will generate a temperature of above 1316° C. (2400° F.).

In one embodiment, the walls of reactor 10 are cooled (fluid cooling) to protect the walls and to keep the titanium dioxide product from sintering on the walls of the reactor such that a scouring media may be used to remove the titanium dioxide. The walls of the reactor maybe cooled by providing a purge of nitrogen or chlorine gas through the reactor walls.

The possibility of controlling raw pigment properties using $TiCl_4$ concentration was tested using the oxidizer configuration shown in FIG. 1. The properties of the pigment produced from a raw pigment can be estimated by measuring the Carbon Black Undertone (CBU) of the raw pigment. To measure CBU, a sample of the raw pigment and a standard sample are each mixed in a paste with carbon black. Reflectance measurements are made with a Hunterlab color difference meter, such as Model D25-9. Undertone is calculated from these measurements. The CBU value gives a measure of mean particle size of the pigment since the reflected light will change from blue, through the spectrum, to red as the particle size increases.

Figure 2:
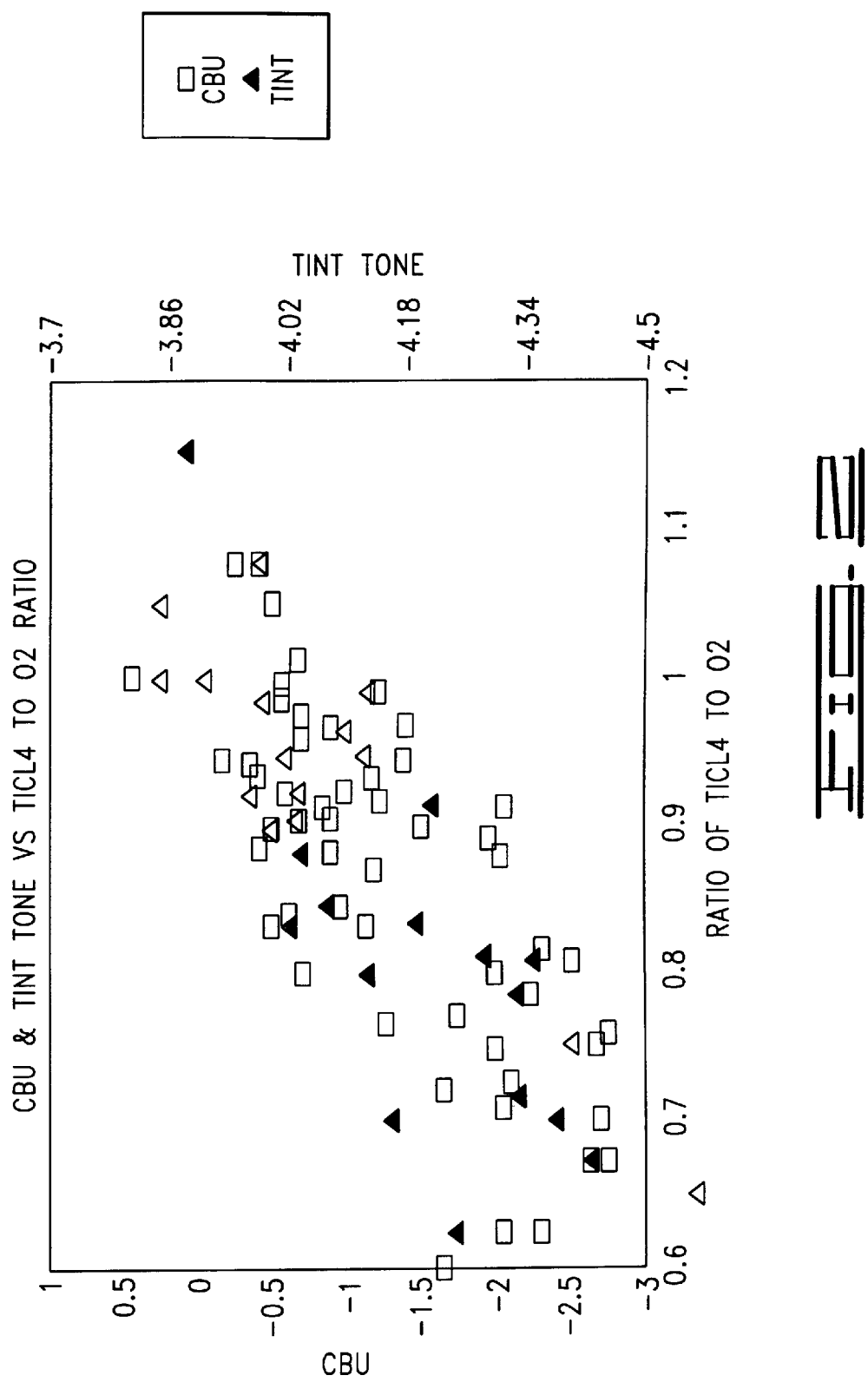
FIG. 2 is a graph showing the relationship of CBU and tint tone vs. TiCl$_4$ to O$_2$ ratio at the primary TiCl$_4$ slot.
Figure 3:
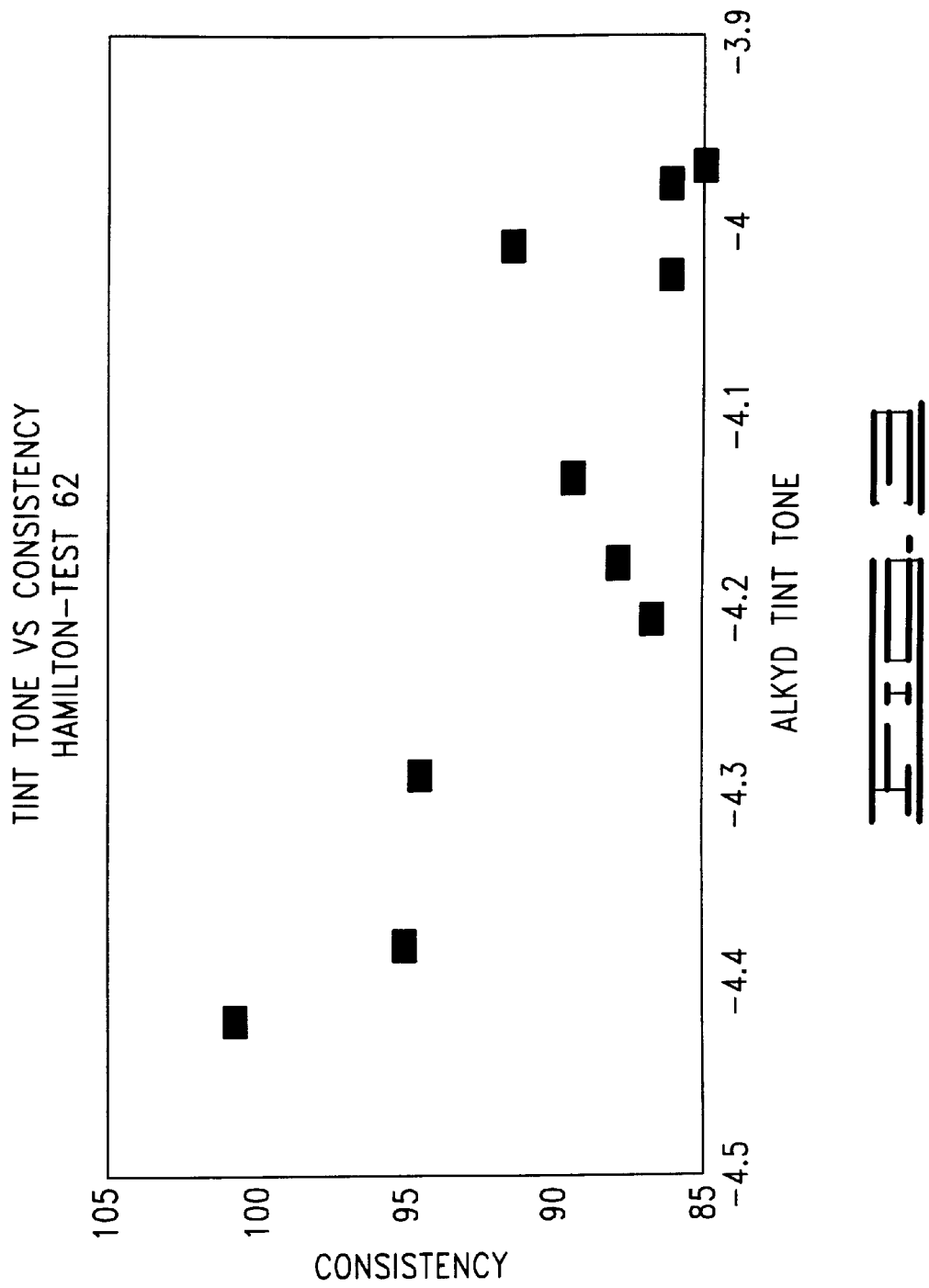
FIG. 3 is a graph showing tint tone vs. consistency.

An oxidizer was designed so that the ratio of $TiCl_4$ to $O_2$ could be controlled by changing the rate of flow of oxygen in the front of the oxidizer. FIG. 2 is a plot showing how raw pigment CBU and finished pigment alkyd tint tone could be controlled by controlling the ratio of $TiCl_4$ to $O_2$ added at the front of the oxidizer. It is necessary to always provide enough $O_2$ to react completely with the $TiCl_4$ vapor in the reactor, so, a second addition of $O_2$ may be necessary. Consistent with the patent of Morris, the oxidizer may also have one or more $TiCl_4$ injection slots. The significant discovery was that an important variable in controlling pigment size was the ratio of $TiCl_4$ to $O_2$ in the region where nucleation is occurring. The data shown in FIG. 2 was collected with three different configurations of the oxidizer. The different positions for addition of the oxygen required to oxidize all of the $TiCl_4$ are shown in FIG. 3. The CBU of the raw pigment, a measurement of particle size, within the uncertainty of measuring reactant volumes and CBU appears to be largely dependent on the ratio of $TiCl_4$ in the region of the oxidizer where nucleation occurs. The properties of the finished pigments are also affected by varying the ratio of $TiCl_4$ to $O_2$. The alkyd tint tone of the finished pigment is shown on the right-hand side of FIG. 2 and the consistency is shown as a function of tint tone in FIG. 3. The consistencies in FIG. 3 were measured after the pigments had been treated with a standard grinding and finishing procedure.

Further inlet points may be positioned such that oxygen may be added to the reaction stream at a point where any previously added titanium tetrachloride has not been substantially completely oxidized. This enables the oxygen which is added at the further inlet points to be at a lower temperature than that added at the first inlet point since the temperature necessary to initiate reaction is provided by the heat of reaction of the previously added titanium tetrachloride. The temperature of the secondary oxygen determines the amount of oxygen that can be used before observing a titanium tetrachloride slip, that is, where unreacted titanium tetrachloride begins to appear in the titanium dioxide product. By varying the temperature of the secondary oxygen, a wide range of $O_2$ may be added to the reactor thus allowing for control of the particle size of the titanium dioxide product.

Oxygen is introduced into the reactor as an oxidizing gas stream which may comprise a gas containing a relatively low proportion of oxygen such as air but may also be substantially pure oxygen or another gas mixture such as oxygen-enriched air.

The primary oxidizing gas stream is usually preheated before introduction into the reactor to a temperature between about 815° C. (1500° F.) and about 982° C. (1800° F.), preferably between about 899° C. (1650° F.) and about 954° C. (1750° F.). Any suitable means can be used to achieve this temperature but the gas stream is conveniently heated by passing it through a hollow metal coil which is externally heated by a gas flame.

Titanium tetrachloride is introduced into the reactor at a temperature of at least about 149° C. (300° F.), preferably between about 149° C. (300° F.) and about 427° C. (800° F.). This temperature may be achieved, at least in part, by utilizing the heat of reaction of aluminum and chlorine which form aluminum chloride with which the titanium tetrachloride is admixed. Advantageously, titanium tetrachloride is first vaporized in preheating equipment to produce titanium tetrachloride vapors. Next, the vapors are preheated to about 350° C. (662° F.) to 400° C. (752° F.) by passing through a hollow coil formed from a metal such as Inconel which is externally heated by a gas flame, and subsequently passed to an aluminum chloride generator where the vapors are mixed with aluminum chloride and further heated to the chosen reaction temperature usually less than about 427° C. (800° F.). An $AlCl_3$ generator may be provided for one or more of the $TiCl_4$ inlet points or one common $AlCl_3$ generator may be used for some or all of the $TiCl_4$ inlet points.

A number of types of aluminum chloride generators are well known in the art and can be used in the process of the invention. For example, powdered aluminum with or without an inert particulate material can be fluidized in a reactor by the upward passage of reactant chlorine and/or an inert gas. Alternatively, aluminum can be introduced into a stream of chlorine gas in particulate form but not necessarily sufficiently finely divided to fluidize in the gas stream. A fixed bed of particulate aluminum can also be chlorinated by passing chlorine into the bed through numerous nozzles surrounding the bed. Other methods include passing chlorine over molten aluminum or feeding two lengths of aluminum wire into a reactor in which they serve as consumable electrodes, a discharge being maintained between these electrodes in the presence of chlorine.

Titanium tetrachloride is mixed with aluminum chloride in such a way that the heat of reaction is used as a means of raising the temperature of the titanium tetrachloride. It may, for example, be passed into the aluminum chloride generator either separately or mixed with chlorine and may form part of the fluidizing gas in a fluid bed reactor. Alternatively it may be mixed with the hot aluminum chloride close to the exit from the generator. It is advantageous to heat the titanium tetrachloride to a temperature of between about 350° C. (662° F.) and about 400° C. (752° F.) and subsequently pass it to the aluminum chloride generator.

The injection and burning of auxiliary fuels in the reactor may be utilized to increase the temperature in the reactor and lower the preheating temperature level requirements for the titanium tetrachloride vapors. Auxiliary fuels may be any low molecular weight organic compounds capable of supporting combustion such as carbon monoxide, methane, propane, butane, pentane, hexane, benzene, xylene, toluene, or any combination thereof In a prefered embodiment, propane is added to oxygen being introduced to the reactor at the first inlet point. Alternatively, the auxiliary fuel may be simply injected directly into the reactor. In another embodiment, plasma, such as that generated by a DC arc or inductively coupled plasma, may effectively be used to heat oxygen prior to introduction into the reactor and lower the temperature level requirements for the titanium tetrachloride vapors.

The proportion of oxygen which is introduced to the reactor at the first inlet point determines to some extent the conditions within the oxidation reactor and can therefore be varied to control these conditions. Usually at least about 50% by weight of the total oxygen feed will be introduced at the first inlet point and preferably the proportion added at the first inlet point is from about 50% to about 95% by weight of the total oxygen feed. Most preferably the proportion is from about 60% to about 95% by weight. The factor determining how much $O_2$ is fed to the first $O_2$ inlet point is determined by how much $TiCl_4$ is fed to the first $TiCl_4$ inlet. The ratio of primary $TiCl_4$ to primary $O_2$ is the one that controls size. Changing the percentage of oxygen at the first inlet point provides control over the pigment properties to allow for compensation for different variables. The percentage of primary oxgen introduced at the first inlet point will depend on the desired tint tone for the finished product. If more positive tint tones are required, the percentage of oxygen introduced at the first inlet point will decrease. Conversely, if more negative tint tones are desired, the percentage of oxygen introduced at the first inlet point will increase.

The quantity of oxidizing gas stream introduced also depends upon the proportion of oxygen present in the gas stream. There must be sufficient oxygen to fully oxidize the total amount of titanium tetrachloride introduced and usually there is more oxygen than is stoichiometrically needed. Typically, the oxidizing gas stream will provide at least about 5% by weight and preferably about 10% by weight more oxygen than is required to completely oxidize the titanium tetrachloride.

Aluminum chloride is present in the titanium tetrachloride to act as a rutilization agent, that is, to promote the formation of rutile titanium dioxide. Normally, the quantity of aluminum chloride used is sufficient to produce between about 0.3% and about 3.0% $Al_2O_3$ by weight in the titanium dioxide product. Preferably, the amount used produces from about 0.3% to about 1.5% $Al_2O_3$ by weight in the titanium dioxide product. The amount of $Al_2O_3$ is dependent on pigment grade being produced. Low durability pigments use little $Al_2O_3$.

The process of this invention is operated at a pressure above atmospheric pressure. The pressure in the reactor during oxidation is at least about 0.15 MPa above atmospheric pressure, and can range from about 0.15 MPa to about 4.0 MPa above atmospheric pressure. Preferably, the pressure range is from about 0.2 MPa to about 0.5 MPa above atmospheric pressure.

The distance between the first $TiCl_4$ introduction assembly and a second $TiCl_4$ introduction assembly and between any further inlet points is governed by the rate of feed of the titanium tetrachloride and the oxidizing gas streams at the previous inlet points. Advantageously the $TiCl_4$ to $O_2$ ratio at the start of the reaction is from about 0.5:1 to about 1.3:1. Ideally a portion of the oxygen introduced at the first oxygen inlet point will be reacted, i.e., a sufficient amount of particle nucleation and rutilization has taken place, before the reactant gas stream reaches the zone of the reactor adjacent to the second oxygen inlet point. Hence the walls are cooled to keep from forming hard accretions. No heat loss would likely be best. As shown in FIGS. 4–8, the second oxygen introduction assembly maybe on either side of the second $TiCl_4$ inlet point and at various distances from the first $TiCl_4$ inlet point without affecting the particle size of the pigment. The particle size of the pigment will not be affected provided the secondary oxygen is introduced into a region of the reactor in which the reaction conditions are favorable for forming titanium dioxide.

Usually, the reactors used for the process of this invention have a generally tubular shape and a portion of the oxidizing gas flow is introduced at one end. The titanium tetrachloride inlet point is close to the end where the oxidizing gas flow is introduced and is introduced through an injector of the type conventionally used for titanium tetrachloride oxidation reactors. For example, the injector may comprise a circumferential slot in the wall of the reactor, an arrangement of perforations in the reactor wall which may extend axially along the reactor, a single jet or nozzle, or an arrangement of jets or nozzles.

Any pipework and associated equipment used to conduct the mixture of titanium tetrachloride and aluminum chloride from the aluminum chloride generator to the first inlet point will usually be formed from a ceramics material to minimize corrosion. Corrosion of the reactor used for the process of the invention can also be reduced by constructing the first inlet point and the walls between the first inlet point and the second inlet point from a ceramics material.

Additives conventionally used in the oxidation of titanium tetrachloride can be used in the process of this invention. For example, alkali metal salts may be added to control the crystal size of the titanium dioxide produced. Preferably, the alkali metal salt is a potassium salt which can be added as potassium chloride to the oxidizing gas stream before the first inlet point. The amount of potassium chloride added may be from about 400 ppm up to about 600 ppm, but preferably the amount added is more than about 0.5 to about 20 ppm potassium with respect to $TiO_2$ formed. A scouring agent such as sand or titanium dioxide can also be added to help prevent fouling of the reactor walls.

The invention provides an easily controllable process for the oxidation of titanium tetrachloride with minimum contamination of the product titanium dioxide and without the use of inflammable liquids. The introduction of all the aluminum chloride with the titanium tetrachloride added at the first inlet point generally leads to easy rutilization of the titanium dioxide formed.

The particle size of the product titanium dioxide can also be adjusted by adjusting the temperature at the first inlet point and/or the pressure in the reactor.

EXAMPLE 1

Tests were performed with cold secondary oxygen, with hot secondary oxygen, and with plasma heated secondary oxygen.

Series 22.

Figure 4:
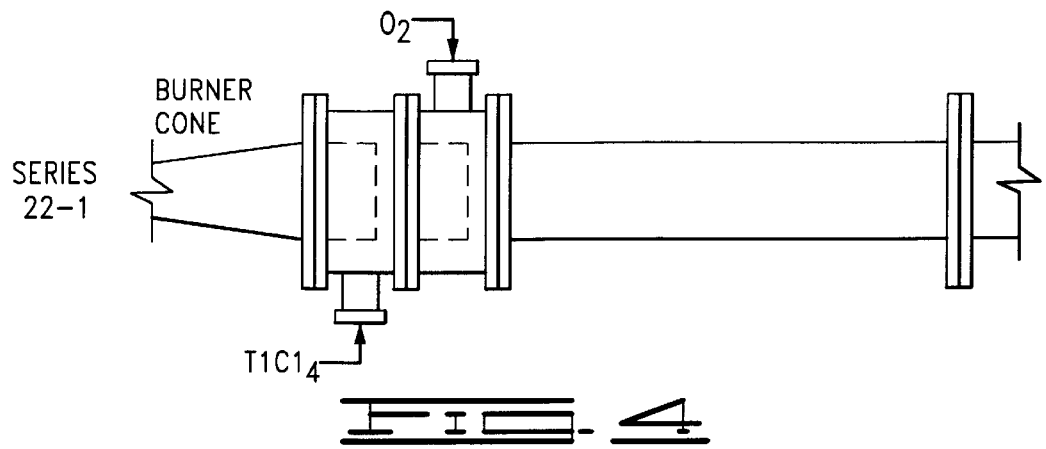
FIG. 4 is a diagrammatic view of one embodiment of the system of the present invention showing the relative positions of the second TiCl$_4$ introduction assembly and the second O$_2$ introduction assembly on the reactor.
Figure 5:
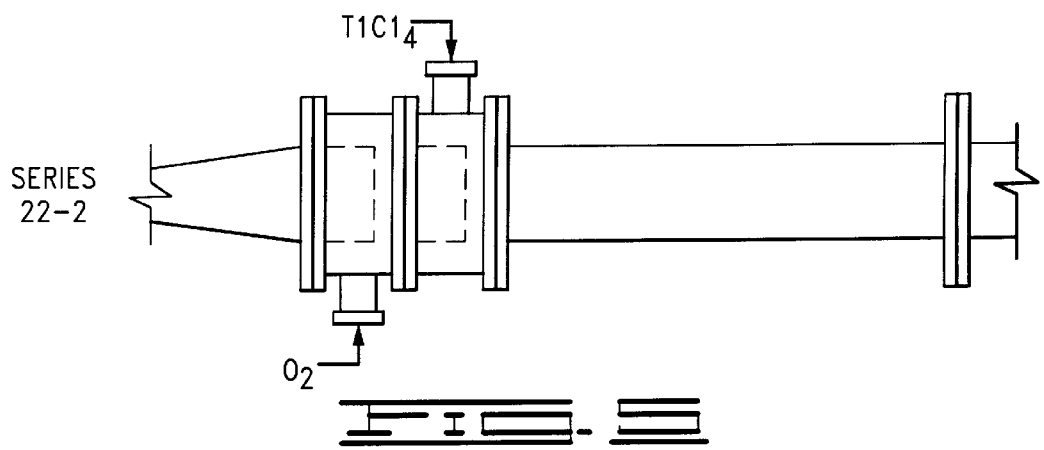
FIG. 5 is a diagrammatic view, similar to FIG. 4, showing another embodiment of the present invention.
Figure 6:
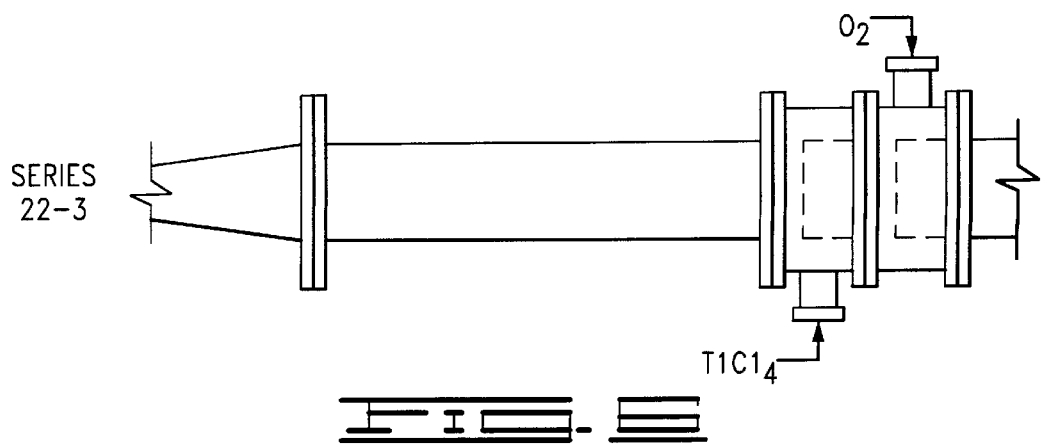
FIG. 6 is a diagrammatic view, similar to FIG. 4, showing another embodiment of the present invention.
Figure 7:
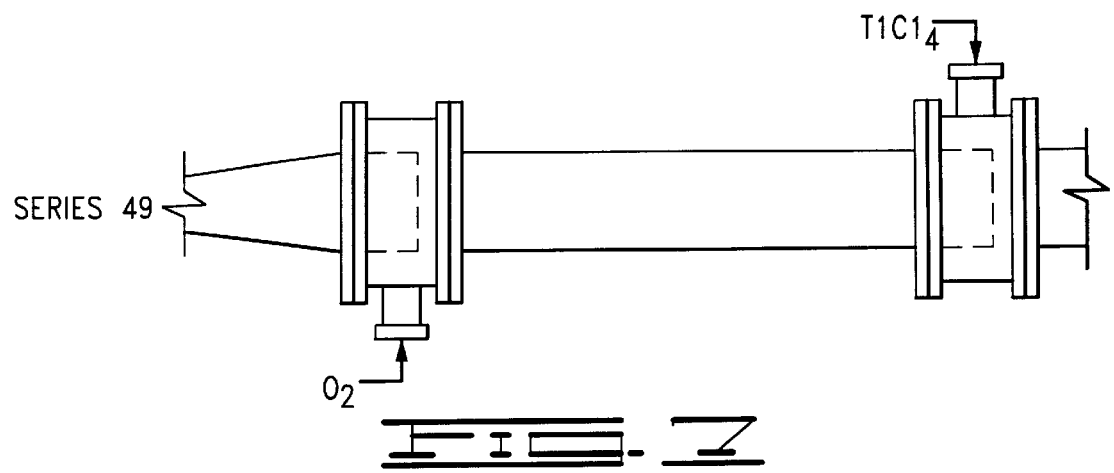
FIG. 7 is a diagrammatic view, similar to FIG. 4, showing another embodiment of the present invention.
Figure 8:
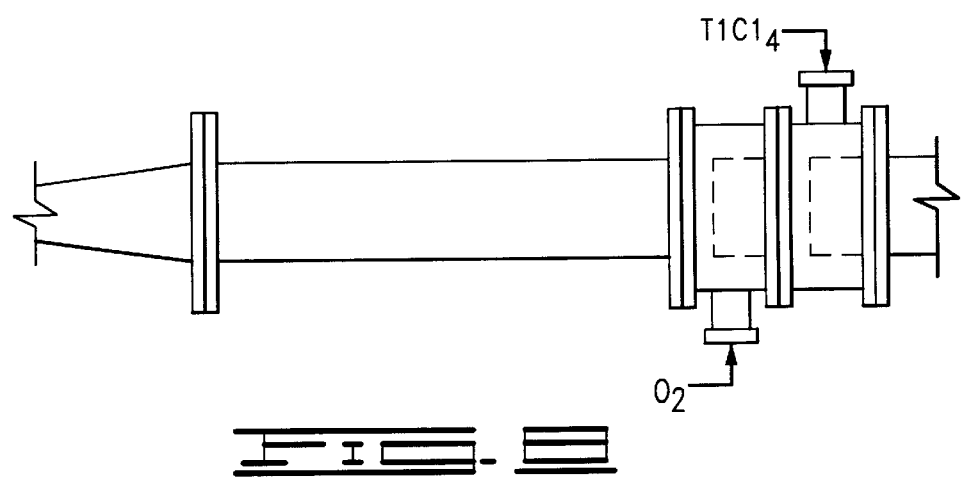
FIG. 8 is a diagrammatic view, similar to FIG. 4, showing another embodiment of the present invention.

This test was run with cold secondary oxygen. The base pigment produced was Kerr-McGee Chemical Corporation (KMCC) CR 813. The raw pigment had about 0.5 percent $Al_2O_3$ and there was no potassium injection. Configurations for the oxidizer as shown in FIGS. 4, 5 and 6 were tested. The CBU of the raw pigment as a function of the primary $TiCl_4$ to primary $O_2$ ratio is shown in FIG. 2.

Series 24.

This test series was similar to Series 22 except potassium was added at the dual slot oxidizer (DSO) and methane was added with the secondary $TiCl_4$. The results of this test are shown in FIG. 2. The two points with $TiCl_4$ to $O_2$ ratios of about 1.2 and CBUs of about −3 were obtained by adding a secondary methane flow in an attempt to improve rutilization.

Series 27.

This test was performed while producing commercial $TiO_2$. One bulk sample was produced with a latex tint tone of −4.2 and a gloss of about 72 when finished with intense grinding. The primary $TiCl_4$ to primary $O_2$ ratio used was about 0.8 and the CBU of the sample was about −2.2. The CBU of a sample produced with a ratio of about 1.02, but not finished was −1.42. suggesting a finished tint tone of about −4.1 or lower. The intense milling was performed to determine whether the more positive CBU was due to larger particles or to agglomeration. The results indicated the raw pigment could be ground to a stable size before finishing and that the pigment was relatively easy to filter. This indicates the raw pigment was large particles rather than agglomerates.

Series 49.

The three previous test series indicated that the rutilization decreased slightly with the use of cold secondary oxygen. In this test, the oxygen flow was split so that two-thirds of the $O_2$ was fed upstream of the primary $TiCl_4$ slot and one-third was fed at the end of the cone. The DSO was located about three feet downstream from the secondary $O_2$ injection slot. The oxidizer configuration for this test is also given in FIG. 6. Two bulk samples from this test configuration and two samples from a control oxidizer were finished. The tint tones were −3.2 for the samples with secondary oxygen and about −4.2 for the control samples. All other properties of the finished pigments appeared to be about the same.

Series 57 and 58.

Plasma was used to heat the secondary oxygen for these tests. The main objective of the tests was to increase rutilization relative to that possible using oxygen heated with a heat exchanger. The pigment produced had positive CBUs as in other cases using secondary $O_2$ with the rutilization being equivalent.

The CBU of the raw pigment increased as the ratio of $TiCl_4$ to $O_2$ increased at the front of the oxidizer in FIGS. 2 and 3. The slope of the line increases rapidly in moving from FIG. 2 through FIG. 3. This suggests that another variable such as the increase in production rates or the position of the potassium injection has increased the effectiveness of the secondary oxygen. The data in FIG. 2 was obtained for a KMCC CR 813 raw pigment indicating that there was no potassium injection, the data in FIG. 3 was obtained with potassium injected at the DSO. The ratio of primary to secondary $TiCl_4$ injection (Rsp) was 0.5 for the data in FIG. 2 and FIG. 3 indicating that the Rsp was not the variable affecting the dependence of CBU on the $TiCl_4$ to $O_2$ ratio.

Test Configuration:

A description of the equipment and the basis for the design is provided below in the Experimental Configuration and a schematic showing the oxygen flow control is given in FIG. 1. The primary $O_2$ and $TiCl_4$ were fed to the oxidizer as is current practice. However, the primary $O_2$ flow was split and a measured part of the oxygen flow sent through a preheater to second $O_2$ slot located immediately downstream of the second $TiCl_4$ slot. The secondary $O_2$ flow rate was measured while the $O_2$ was cold and then sent to a preheater where its temperature was controlled. It was possible to control particle size using the system shown schematically in FIG. 1.

The configuration for the oxidizer is basically the same as shown in FIG. 4. FIG. 3 results indicate the configuration of the oxidizer does not have a major effect on the pigment properties but the DSO and secondary oxygen spool was less affected by abrasion if the spools were further downstream than in FIGS. 4 or 5. Initially potassium was added at the end of the cone but several samples were collected with potassium added at the DSO, particularly if rutilization was low or the CBU was not positive enough. The secondary oxygen preheater was installed on a 6-inch line, and the control line, was also a 6-inch line. The test line and control line were operated as near full capacity as possible.

The oxygen preheater must be capable of preheating about one half the total oxygen normally fed to a 6-inch oxidizer to 1038° C. (1,900° F.). An objective of the test was to determine the minimum temperature of the secondary oxygen required for acceptable rutilization at each alumina level.

Test Procedures:

A detailed discussion of the test procedures is provided below in the Experimental Procedures—Test Series 62. Three sets of tests were performed. Each set was at a different coburned $Al_2O_3$ level. The lower level was at approximately 0.5 percent and the higher level was at about 1.2 percent coburned $Al_2O_3$. The third series was intermediate between these levels. The primary $TiCl_4$ to primary oxygen ratio was varied from the minimum level required to protect the heat exchanger tubes and keep the secondary oxygen slot open to a maximum $TiCl_4$ to $O_2$ ratio of about 1 at the front of the oxidizer. Depending on the rate of change either two or three intermediate samples were collected. Bulk samples were collected from a control line, at the start of the test series and the end of the test series.

Temperatures were measured during the tests to obtain axial profiles along the length of the tube and to obtain a radial temperature profile with $O_2$ streams that were independently controlled and heated at the end of the cone for each-different $TiCl_4$ to $O_2$ ratio.

All the bulk samples from this test series were finished.

EXAMPLE 2

The primary purpose of the secondary oxygen addition was to develop a method yielding improved raw pigment properties. The pigment particles produced were larger and thus the finished pigments had a more positive tint tone. The pigments produced with secondary oxygen were less aggregated than pigment produced using the prior art oxidizer configuration by virtue of the fact that the pigment gets larger by coalescing. Some aggregation was likely present as a result of interactions of the pigment particles on the wall of the oxidizer. Secondary oxygen does not reduce aggregation that occurs as a result of such interactions. The reasons particles coalesce to a larger size with secondary oxygen are likely because rutilization of the particles occurs more slowly and because the initial concentration of $TiCl_4$ is higher. Analysis of the results indicated that the main variable affecting raw pigment CBU is the $TiCl_4$ to $O_2$ ratio at the primary slot.

Test Configuration

The configuration of the oxidizer injection slots is as shown in FIG. 6. The secondary oxygen was heated in a heat exchanger consisting of a radiant section with three identical helical coils and a convection section at the top consisting of a number of J tubes welded together. The unit was designed to deliver 330 scfm of heated oxygen at temperatures as high as 1038° C. (1900° F.).

The temperature of the oxygen in the front of the oxidizer was higher for the secondary oxygen tests than for normal operation because the amount of $TiCl_4$ per unit of oxygen is higher. This higher temperature came from using a greater amount of propane per unit of oxygen for supported combustion at the sand scour nozzle. The propane to $TiCl_4$ ratio required to reach the same mix temperature is therefore about the same.

Test Procedures

The objective of this series of tests was to determine the effect of different $TiCl_4$ to $O_2$ ratios at the primary slot on raw pigment properties. The ratio of $TiCl_4$ to $O_2$ was varied from about 0.6 to about 1.0 with $Al_2O_3$ compositions varying from about 0.5 percent to about 1.2 percent. The lower value of the $TiCl_4$ to $O_2$ ratio was determined by the minimum value required to keep the secondary oxygen slot from plugging. The maximum ratio was the ratio that would not result in a decrease in particle size or a decrease in CBU with an increase in the ratio.

The test series was divided into three subseries. The test series and major variables in the test were as follows:

Series 62-1.

Raw pigment with an $Al_2O_3$ content of 0.5 percent was produced in this test series. The oxidizer was started at the flutter point at the start of each test, the Rsp was set at 0.2 to 0.25, and the secondary oxygen fed to the oxidizer at 927° C. (1700° F.). The first test was at the minimum $TiCl_4$ to $O_2$ ratio, the RTO, and the final test of this subseries was at a ratio of about 1. Two or three tests were performed at intermediate ratios. Tube samples were taken to evaluate each operating condition. If the rutilization was below about 98.3, the amount of propane used for supported combustion was increased by 1 scfm. The amount of propane was increased by up to 4 scfm until it was obvious that increasing the amount of propane did not increase rutilization. The secondary $O_2$ temperature was then raised in 38° C. (100° F.) increments until the temperature reached 1038° C. (1900° F.) or acceptable rutilization was attained. If the percent rutile was above 99.6 percent, the $TiCl_4$ to $O_2$ ratio was increased to approximately 1.0 and if the rutilization remained high the secondary oxygen temperature was decreased in 38° C. (100° F.) increments to determine the minimum preheat required to attain 100 percent rutilization. Once this temperature was determined for an RTO of 1.0, the ratio was decreased incrementally to the minimum value described. When this sequence of tests was completed, the Rsp was increased to about 0.3 to 0.35 to determine if conditions could be found that would produce approximately 100 percent rutilization and no $TiCl_4$ slip.

Series 62-2.

This test series was similar to Series 62-1 except it was performed while producing a raw pigment with about 1.2 percent coburned $Al_2O_3$. The temperature of the secondary oxygen was set lower than 1038° C. (1900° F.).

Series 62-3.

A series of tests at an intermediate $Al_2O_3$ level of about 0.8 percent was performed using the same sequence as for Series 62-1 and 62-2.

Small samples collected while the unit was operating under steady conditions were used to determine the process variability of an oxidizer running with secondary $O_2$.

Changes may be made in the combination and arrangement of the various parts, elements, steps and procedures described herein without departing from the spirit and scope of the invention as defined in the following claims.

What is claimed is:

1. A process for the production of titanium dioxide comprising reacting titanium tetrachloride with oxygen at atmospheric pressure or above and at a reaction temperature of at least about 700° C. in an oxidation reactor having a first reaction zone and a second reaction zone spaced a distance from the first reaction zone, the oxygen being introduced into the reactor at a first inlet point in the first reaction zone before any titanium tetrachloride is introduced and into at least one further inlet point in the second reaction zone, the titanium tetrachloride introduced into the reactor being heated to a temperature of less than about 427° C. prior to introduction, and controlling the titanium tetrachloride to oxygen ratio in the first reaction zone to thereby control the particle size of the produced titanium dioxide.

2. The process according to claim 1 wherein the titanium tetrachloride introduced into the reactor is an admixture with aluminum chloride.

3. The process according to claim 2 wherein the aluminum chloride is formed by reaction of aluminum and chlorine and the heat generated by this reaction is used to heat the titanium tetrachloride introduced into the reactor.

4. The process according to claim 3 wherein titanium tetrachloride is first heated to a temperature between about 350° C. and about 400° C. before being passed to an aluminum chloride generator.

5. The process according to claim 3 wherein the mixture of titanium tetrachloride and aluminum chloride is conducted to the reactor by a pipework constructed from a ceramics material.

6. The process according to claim 1 wherein the walls of the reactor between the first inlet point and the further inlet point are constructed from a ceramics material.

7. The process according to claim 2 wherein aluminum chloride is introduced in an amount sufficient to produce between about 0.3 and about 3.0 percent by weight $Al_2O_3$ in the product titanium dioxide.

8. The process according to claim 7 wherein the amount of aluminum chloride is sufficient to produce from about 0.3 to about 1.5 percent by weight $Al_2O_3$ in the product titanium dioxide.

9. The process according to claim 1 wherein the titanium tetrachloride is introduced into the reactor at a temperature of about 399° C.

10. The process according to claim 2 wherein the aluminum chloride is mixed with titanium tetrachloride prior to introduction into the reactor.

11. The process according to claim 1 wherein oxygen introduced at the first inlet point is preheated to a temperature between about 815° C. and about 982° C.

12. The process according to claim 11 wherein said oxygen introduced at the first inlet point is preheated to a temperature of about 954° C.

13. The process according to claim 1 wherein oxygen introduced at the further inlet point is heated to a temperature between about 25° C. and about 1037° C. and is introduced in an amount sufficient to react with unreacted titanium tetrachloride.

14. The process according to claim 13 wherein at least about 50 percent by weight of the oxygen is introduced at the first inlet point.

15. The process according to claim 14 wherein from about 50 to about 95 percent by weight of the oxygen is introduced at the first inlet point.

16. The process according to claim 15 wherein from about 60 to about 95 percent by weight of the oxygen is introduced at the first inlet point.

17. The process according to claim 1 wherein the amount of oxygen introduced is equivalent to at least about 5 percent by weight more than is required to completely oxidize the titanium tetrachloride.

18. The process according to claim 17 wherein the amount of oxygen introduced is equivalent to at least about 10 percent by weight more than is required to completely oxidize the titanium tetrachloride.

19. The process according to claim 1 wherein the pressure in the reactor is between about 0.15 MPa and about 4.0 MPa above atmospheric pressure.

20. The process according to claim 1 wherein an auxiliary fuel is added to the oxygen being introduced to the reactor at the first inlet point.

21. The process according to claim 20 wherein the auxiliary fuel is carbon monoxide, methane, propane, butane, pentane, hexane, benzene, xylene, toluene, or combinations thereof.

22. The process according to claim 1 wherein the oxygen being introduced to the reactor at the first inlet point is heated with plasma.

23. The process according to claim 1 wherein a potassium salt is added to oxygen introduced at the first inlet point before mixing with the titanium tetrachloride, the potassium salt being added in an amount equivalent to form about 400 parts per million to about 600 parts per million potassium chloride by weight with respect to the titanium dioxide product.

24. The process according to claim 23 wherein the amount of potassium is equivalent to more than about 20 parts per million by weight with respect ot titanium dioxide product.

25. The process according to claim 1 wherein the walls of the reactor are cooled.

26. The process according to claim 25 wherein the walls of the reactor are cooled by providing a purge of nitrogen or chlorine gas.

27. The process according to claim 1 wherein at least one of the inlet points comprises a circumferential slot in the wall of the reactor.

28. A process for the production of titanium dioxide in an oxidation reactor having a first reaction zone and a second reaction zone spaced a distance from the first reaction zone, the process comprising:

introducing an amount of oxygen in the first reaction zone;

introducing an amount of titanium tetrachloride in the first reaction zone wherein the amount of oxygen introduced in the first reaction zone and the amount of titanium tetrachloride introduced in the first reaction zone defines a titanium tetrachloride to oxygen ratio;

reacting the titanium tetrachloride with the oxygen at a reaction temperature of at least about 700° C. to produce titanium dioxide;

controlling the titanium tetrachloride to oxygen ratio in the first reaction zone to thereby control the particle size of the produced titanium dioxide; and introducing secondary oxygen in the second reaction zone in an amount sufficient to react with unreacted titanium tetrachloride therein.

29. The process according to claim 28 further comprising admixing the titanium tetrachloride introduced into the reactor with aluminum chloride before introducing the titanium tetrachloride into the reactor.

30. The process according to claim 29 further comprising:
generating the aluminum chloride by reacting aluminum with chlorine in an aluminum chloride generator; and
heating the titanium tetrachloride introduced into the first reaction zone with heat generated from the aluminum chloride generator.

31. The process according to claim 30 further comprising preheating the titanium tetrachloride to a temperature between about 350° C. and about 400° C. before passing the titanium tetrachloride to the aluminum chloride generator.

32. The process according to claim 29 wherein the aluminum chloride is introduced in an amount sufficient to produce between about 0.3 and about 3.0 percent by weight $Al_2O_3$ in the titanium dioxide product.

33. The process according to claim 28 further comprising introducing a second addition of titanium tetrachloride into the reactor near the second reaction zone.

34. The process according to claim 33 further comprising admixing the second addition of titanium tetrachloride introduced into the reactor with aluminum chloride before introducing the titanium tetrachloride into the reactor.

35. The process according to claim 34 further comprising:
generating the aluminum chloride by reacting aluminum with chlorine in an aluminum chloride generator; and
heating the second addition of titanium tetrachloride introduced into the reactor with heat generated from the aluminum chloride generator.

36. The process according to claim 35 further comprising admixing the titanium tetrachloride introduced into the first reaction zone with the aluminum chloride before introducing the titanium tetrachloride into the first reaction zone.

37. The process according to claim 36 further comprising heating the titanium tetrachloride introduced into the first reaction zone with the heat generated from the aluminum chloride generator.

38. The process according to claim 28 wherein the titanium tetrachloride is introduced into the reactor at a temperature of about 399° C.

39. The process according to claim 37 wherein the second addition of titanium tetrachloride is introduced into the reactor at a temperature of about 399° C.

40. The process according to claim 37 wherein the titanium tetrachloride introduced into the first reaction zone and the second addition of titanium tetrachloride is introduced into the reactor at a temperature of about 399° C.

41. The process according to claim 28 further comprising preheating the oxygen introduced in the first reaction zone to a temperature between about 815° C. and about 982° C.

42. The process according to claim 28 further comprising preheating the secondary oxygen introduced in the second reaction zone to a temperature between about 25° C. and about 1037° C.

43. The process according to claim 41 wherein from about 50 to about 95 percent by weight of the oxygen introduced in the reactor is introduced in the first reaction zone.

44. The process according to claim 28 wherein the amount of oxygen introduced in the first reaction zone and the second reaction zone is equivalent to at least about 5 percent by weight more than is required to completely oxidize the amount of titanium tetrachloride introduced in the reactor.

45. The process according to claim 28 further comprising operating the reactor at a pressure between about 0.15 MPa and about 4.0 MPa above atmospheric pressure.

46. The process according to claim 28 further comprising adding an auxiliary fuel to the oxygen being introduced in the first reaction zone.

47. The process according to claim 46 wherein the auxiliary fuel is carbon monoxide, methane, propane, butane, pentane, hexane, benzene, xylene, toluene, or combinations thereof.

48. The process according to claim 28 further comprising heating the oxygen being introduced in the first reaction zone with plasma.

49. The process according to claim 28 further comprising heating the secondary oxygen being introduced in the reactor with plasma.

* * * * *